(12) United States Patent
Doepke et al.

(10) Patent No.: US 8,677,257 B2
(45) Date of Patent: Mar. 18, 2014

(54) GRANULAR GRAPHICAL USER INTERFACE ELEMENT

(75) Inventors: Frank Doepke, San Jose, CA (US); Hans-Werner Neubrand, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1302 days.

(21) Appl. No.: 11/462,683

(22) Filed: Aug. 4, 2006

(65) Prior Publication Data

US 2008/0034289 A1 Feb. 7, 2008

(51) Int. Cl.
*G11B 27/00* (2006.01)
*G06F 3/00* (2006.01)
*G06F 9/00* (2006.01)
*G06F 17/00* (2006.01)

(52) U.S. Cl.
USPC ........... 715/764; 715/763; 715/711; 715/726; 715/790

(58) Field of Classification Search
USPC .......................... 715/764, 763, 711, 726, 790
See application file for complete search history.

(56) References Cited

U.S. PATENT DOCUMENTS

| | | | |
|---|---|---|---|
| 5,432,932 A * | 7/1995 | Chen et al. ..................... | 718/103 |
| 5,600,789 A * | 2/1997 | Parker et al. ..................... | 714/38 |
| 5,832,173 A | 11/1998 | Terasawa et al. | |
| 6,377,254 B1 | 4/2002 | Sakaguchi | |
| 6,570,596 B2 * | 5/2003 | Frederiksen .................. | 715/808 |
| 6,922,816 B1 | 7/2005 | Amin et al. | |
| 7,509,593 B2 * | 3/2009 | Kaminagayoshi ........... | 715/862 |
| 2004/0196267 A1 | 10/2004 | Kawai et al. | |

FOREIGN PATENT DOCUMENTS

| | | |
|---|---|---|
| EP | 0544534 A2 | 6/1993 |
| JP | 05-151650 A | 6/1993 |
| JP | 2004310219 | 11/2004 |

OTHER PUBLICATIONS

Pellacini, A User Interface for Interactive Cinematic Shadow Design, 2002, ACM pp. 563-566.*
International Search report dated Jan. 31, 2008 (PCT/US 05/019108).
Ahlberg, Christopher and Ben Shneiderman. "The Alphaslider: A Compact and Rapid Selector." Proceedings of CHI: AMC Conference on Human Factors in Computing Systems. Apr. 28, 1994. pp. 365-371.
Blanch, Renaud, Yves Guiard and Michel Beaudouin-Lafon. "Semantic Pointing: Improving Target Acquisition with Control-Display Ration Adaption." CHI Papers: Vienna, Austria. vol. 6, No. 1. Apr. 29, 2004. pp. 519-526.

(Continued)

*Primary Examiner* — Boris Pesin
*Assistant Examiner* — Sabrina Greene
(74) *Attorney, Agent, or Firm* — Kilpatrick Townsend & Stockton LLP

(57) ABSTRACT

A graphical user interface (GUI) element permits a user to control an application in both a coarse manner and a fine manner. When a cursor is moved to coincide or overlap the displayed GUI element, parameter adjustment is made at a first (coarse) granularity so that rapid changes to the target parameter can be made (e.g., displayed zoom level, image rotation or playback volume). As the cursor is moved away from the displayed GUI element, parameter adjustment is made at a second (fine) granularity so that fine changes to the target parameter can be made. In one embodiment, the further the cursor is moved from the displayed GUI element, the finer the control.

39 Claims, 6 Drawing Sheets

(56) References Cited

OTHER PUBLICATIONS

Igarashi, Takeo and Ken Hinckley. "Speed-dependent Automatic Zooming for Browsing Large Documents." CHI Letters: San Diego, CA. vol. 2, 2. Nov. 5, 2000. pp. 139-148.
Masui, Toshiyuki, Kouichi Kashiwagi and George R. Borden IV. "Elastic Graphical Interfaces for Precise Data Manipulation." ACM Conference on Human Factors in Computing Systems (CHI '95) Conference Conpanion. Apr. 1995. pp. 1-2.
Masui, Toshiyuki. "LensBar—Visualization for Browsing and Filtering Large Lists of Data." IEEE Symposium on Research Triangle: Los Almaitos, CA. Oct. 19, 1998. pp. 113-120.
Ramos, Gonzalo and Ravin Balakrishnan. "Zliding: Fluid Zooming and Sliding for High Precision Parameter Manipulation." UIST: Seattle, WA. Oct. 27, 2005. pp. 143-152.
Japanese Office Action dated Oct. 28, 2011 regarding Japanese Patent Application2009-523925 fied on Aug. 3, 2007.
International Preliminary Report on Patentability for PCT Application No. PCT/US2007/075199, mailed Feb. 10, 2009, 6 pages.
Written Opinion for PCT Application No. PCT/US2007/075199, mailed Feb. 4, 2009, 5 pages.
International Search Report for PCT Application No. PCT/US2007/075199, mailed Jan. 31, 2008, 4 pages.
Extended European Patent Office Search Report for Application No. 12 172 974.3, mailed on Aug. 20, 2012, 8 pages.
Japanese Office Action mailed Dec. 7, 2012 regarding Japanese Patent Application 2009-523925, 2 pages.
Ahlberg, Christopher and Shneiderman, Ben; "The Alphaslider: A Compact and Rapid Selector", Proceedings of CHI: ACM Conference on Human Factors in Computing Systems, Apr. 28, 1994, pp. 365-371, XP001248119, 7 pages.
Masui, Toshiyuki, et al. "Elastic Graphical Interfaces for Precise Data Manipulation", ACM Conference on Human Factors in Computing Systems, Apr. 1995, XP002464849, 2 pages.
Masui, Toshiyuki, "LensBar—Visualization for Browsing and Filtering Large Lists of Data", Information Visualizatio, 1998 Proceedings, IEEE Symposium on Research Triangle, Oct. 19, 1998, XP010313308, 8 pages.
Igarashi, Takeo and Hinckley, Ken; "Speed-Dependent Automatic Zooming for Browsing Large Documents", UIST '00 Proceedings of the 13th Annual ACM Symposium on User Interface Software and Technology; Nov. 5, 2000, pp. 139-148, XP002424197, 10 pages.
Blanch, Renaud et al., "Semantic Pointing: Improving Target Acquisition with Control-Display Ratio Adpatation", CHI 2004, Vienna, Austria, Apr. 29, 2003, XP002464851, 8 pages.
Ramos, Gonzalo and Balakrishnan, Ravin;."Zliding: Fluid Zooming and Sliding for High Precision Paramente Manipulation", USIT '05 Proceedings of the 18th Annual ACM Symposium on User Interface Software and Technology, Oct. 27, 2005, pp. 143-152, XP002464850, 10 pages.

* cited by examiner

GRANULAR GRAPHICAL USER INTERFACE ELEMENT

BACKGROUND

The invention relates generally to graphical user interfaces for computer systems and, more particularly, to a graphical user interface element providing multiple levels of granularity for application control.

In general, a user interface is the means through which a user interacts with a computer system. Graphical user interfaces (GUIs) employ windows and icons in conjunction with a cursor control device. Most cursor control devices include a switch for generating signals to the computer system to indicate a selection or other user action. The combination of windows, icons, and a cursor control device permits a user to operate in a visual "point-and-click" manner. As used herein, the phrase "point-and-click" refers to positioning a cursor on a display so it is over a desired image and activating a switch (e.g., a button, a finger tap or a stylus tap) on the cursor control device. One illustrative graphical user interface is the Finder™ interface for the Macintosh® family of computer systems. (FINDER is a trademark of, and MACINTOSH is a registered trademark of, Apple Computer, Inc. of Cupertino, Calif.)

Equipment and application controls have been simulated for display through a GUI. For example, graphical representations of a volume control knob and a visual zoom slider control are indicative of GUI elements used in today's graphical user interfaces. To adjust the application's settings (e.g., the playback volume, visual magnification or angle of image rotation), the user positions a cursor over the graphical representation of the knob or slider, activates the cursor control device by clicking and holding the cursor control device's button and drags the cursor in a circular or linear motion to achieve the desired setting (e.g., volume, rotation or zoom level).

While more convenient than a command-line input interface, conventional GUI elements only permit the user to adjust the desired parameter in a linear fashion. That is, when the user adjusts the GUI element through a specified range (e.g., 45 degrees rotation or 1 inch of liner motion), conventional GUI elements adjust the associated parameter (e.g., image rotation or volume) a corresponding specified amount. This can make it difficult for a user to rapidly change the target parameter through a large range while also permitting the user to finely adjust the parameter's final or end-value. For example, if a 2 inch slider is used to control the rotation of a selected image, a 1 inch change in the slider control's position will cause a 180 degree rotation of the displayed image. While this permits the user to rapidly adjust the image's rotation through a wide range, the resolution of the GUI element can make it difficult to precisely control the final value.

Thus, it would be beneficial to provide a GUI element that permits a user to rapidly adjust an application's operation in a first (coarse) manner while also permitting the user to adjust the application's operation is a second (fine) manner.

SUMMARY

A graphical user interface (GUI) element permits a user to control an application in both a coarse manner and a fine manner. When a cursor is moved to coincide or overlap the displayed GUI element, parameter adjustment is made at a first (coarse) granularity so that rapid changes to the target parameter can be made (e.g., displayed zoom level, image rotation or playback volume). As the cursor is moved away from the displayed GUI element, parameter adjustment is made at a second (fine) granularity so that fine changes to the target parameter can be made. In one embodiment, the further the cursor is from the displayed GUI element, the finer the control. By way of example, consider the case when a cursor is moved through a 45 degree angle: when coincident with the GUI element, this action can cause a selected image to rotate through 45 degrees; when 1 inch away from the GUI element, this action may cause selected image to rotate through only 20 degrees; and when 3 inches away from the GUI element, this action may cause selected image to rotate through only 5 degrees.

DETAILED DESCRIPTION

The following description is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

A graphical user interface element in accordance with the invention provides a user with the ability to adjust an operating characteristic of an application (e.g., zoom level, page or list display, image rotation, image exposure and volume), wherein a given amount of cursor movement causes a specified amount of change when the cursor is coincident/over the displayed GUI element and a lesser amount of change when the cursor is off or away from the GUI element. That is, the granularity of the change associated with a given cursor movement is modified as a function of the distance between the cursor and GUI element. For example, the further the cursor is moved from the displayed GUI element, the less change (e.g., the amount of zoom, movement within a page or list, rotation, exposure or volume change) a given amount of cursor movement will effect. One benefit of a GUI element in accordance with the invention is that a single control element can be used to rapidly "get close" to the user's desired setting while also permitting the user to use relatively large cursor movements to effect fine or small changes to the target parameter.

Figure 1A:
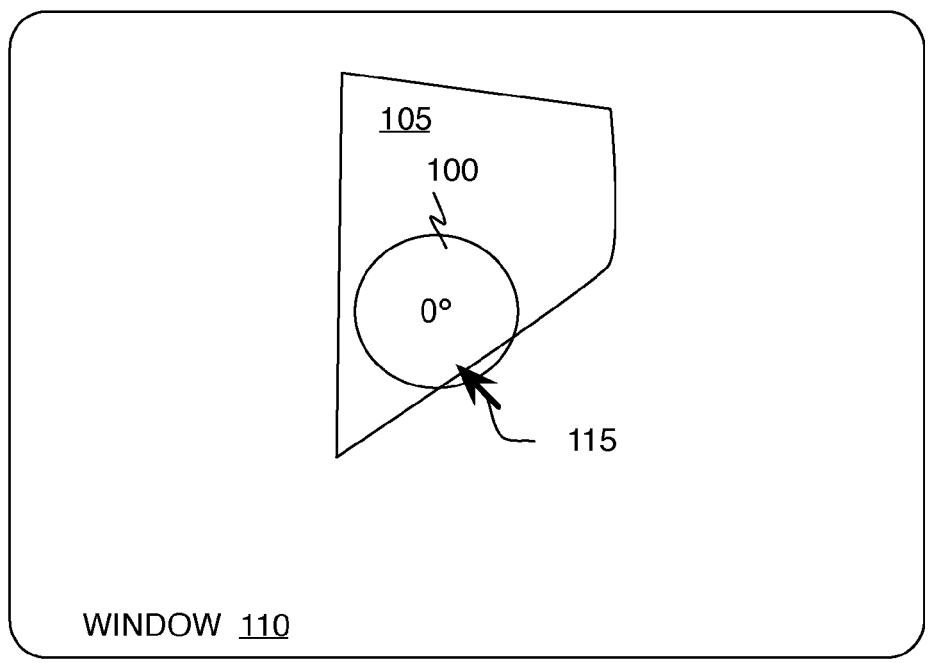
FIGS. 1A-1D illustrates, in block diagram form, the operation of a graphical user interface element in accordance with one embodiment of the invention.
Figure 1B:
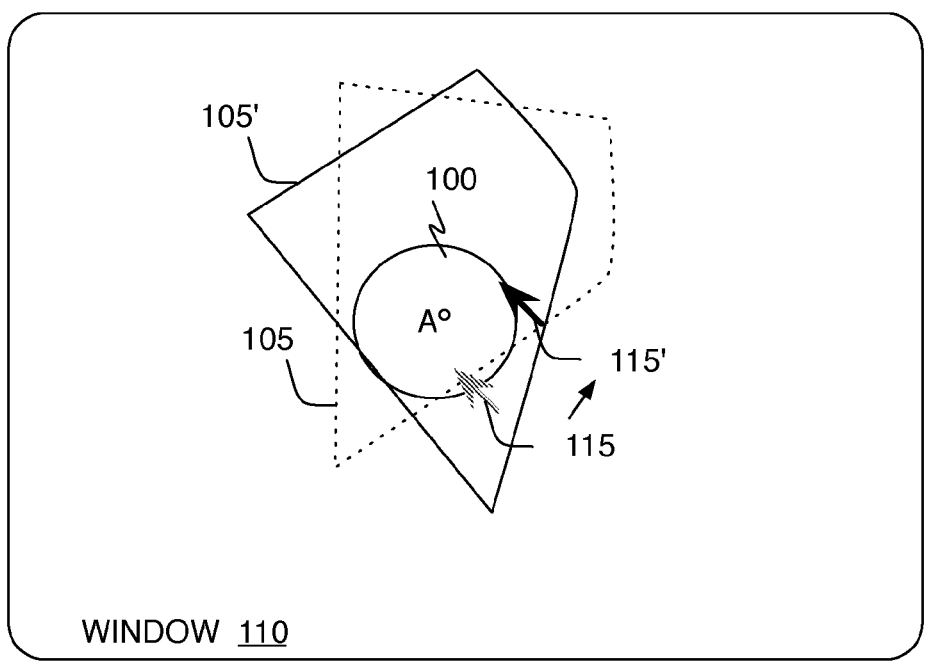

Referring to FIG. 1A, in one embodiment GUI element 100 in accordance with the invention is used to rotate image 105 in graphics window 110. With the cursor positioned over GUI element 100, rotation is effected at a first granularity. Referring to FIG. 1B, with cursor 115 over GUI element 100, cursor motion about the center of GUI element 100 of a specified amount (i.e., the difference between cursor position 115 and 115') causes image 105 to be rotated X degrees in steps of, for example, 15 degrees, resulting in image 105'.

Figure 1C:
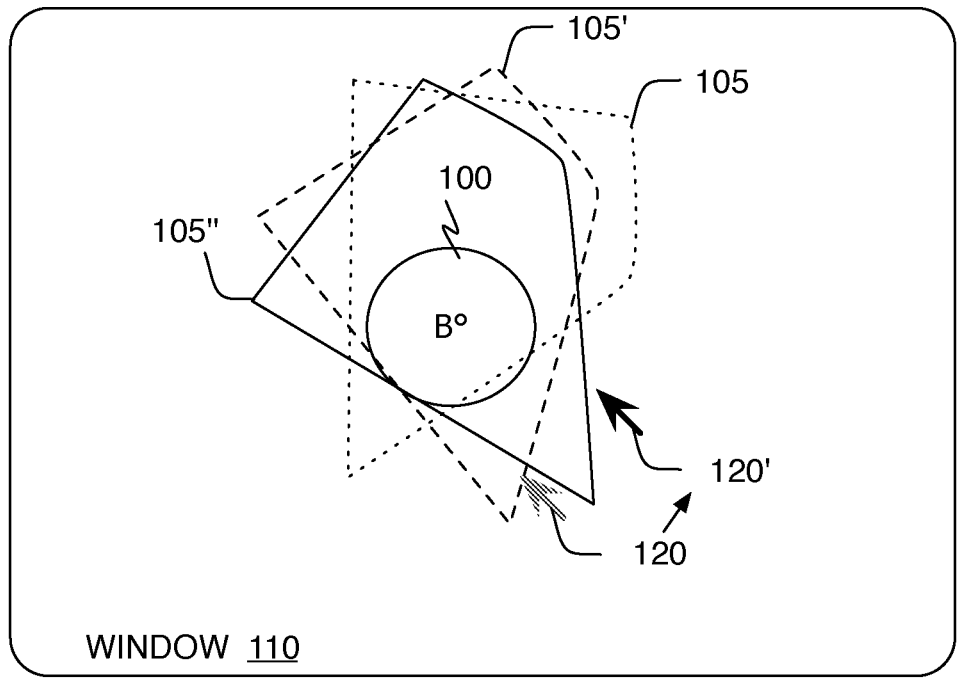

With the cursor positioned away from GUI element 100, rotation is effected at a second granularity. Referring to FIG. 1C, with cursor 120 located away from GUI element 100, cursor motion about the center of GUI element 100 of the specified amount (i.e., the same as in FIG. 1B) causes image 105' to be rotated Y degrees in steps of, for example, 1 degree, resulting in image 105".

Figure 1D:
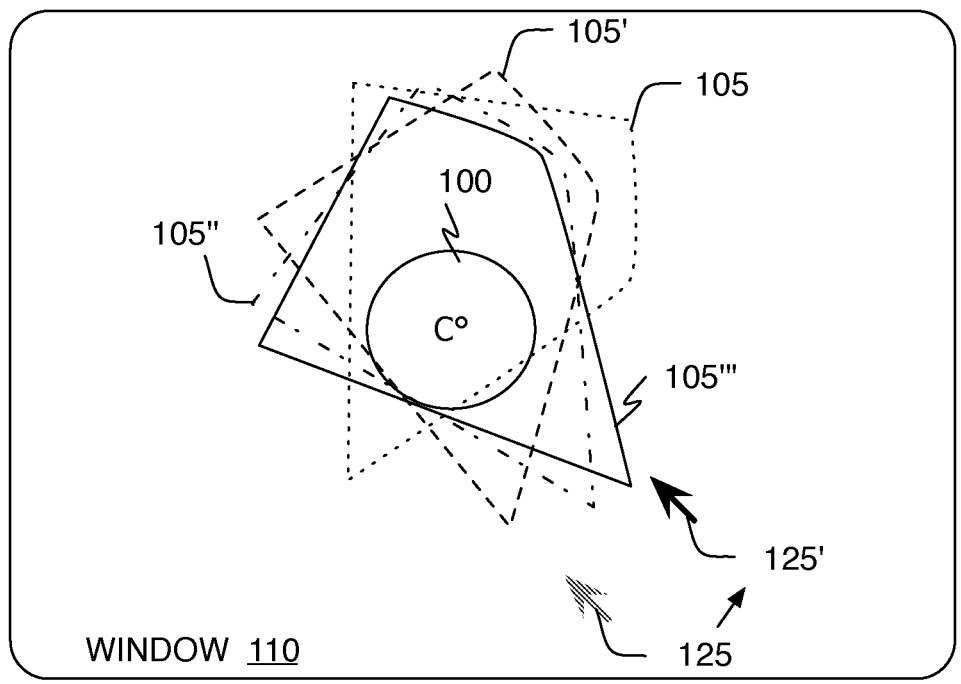

With the cursor positioned still further away from GUI element 100, rotation is effected at a third granularity. Referring to FIG. 1D, with cursor 125 further away from GUI element 100 (relative to the cursor position illustrated in FIG. 1C), cursor motion about the center of GUI element 100 of the specified amount (i.e., the same as indicated in FIGS. 1B and 1C) causes image 105" to be rotated Z degrees in steps of, for example, 0.5 degrees, resulting in image 105'''.

It is significant to note that while the amount of cursor motion is the same in FIGS. 1B, 1C and 1D (i.e., rotation about the center of GUI element 100), the amount of image rotation is less in FIG. 1D than in FIG. 1C and less in FIG. 1C than in FIG. 1B. That is, as the cursor is moved away from GUI element 100, a given amount of cursor motion effects a smaller amount of rotation—the granularity of the targeted effect (e.g., image rotation) changes as the cursor is moved away from, or toward, GUI element 100.

In the illustrative embodiment of FIGS. 1A-1D, the target image (i.e. image 105, 105', 105" and 105''') was rotated about its center point. In another embodiment, however, the image could be rotated about an arbitrary point such as the point identified by the cursor when GUI element 100 is displayed. Similarly, if there are multiple objects in the window, each capable of being rotated, the cursor may be placed over that object the user desires to rotate before displaying GUI element 100.

Also in accord with the illustrative embodiment of FIGS. 1A-1D, GUI element 100 includes an indication of the current amount of image rotation (i.e., 0° in FIG. 1A, A° in FIG. 1B, B° in FIG. 1C and C° in FIG. 1D). This can be useful feedback to the user in that as the amount of rotation approaches the desired value, the user can move the cursor further away from GUI element 100 so that finer adjustments may be made. In other embodiments, this information may be displayed through the status bar of the target application, as a field displayed at a user or system specified location or in any other manner known in the art.

In accordance with the invention, GUI element 100 may be displayed through a user action such as, for example, by depressing a predetermined key (e.g., the Option key), a combination of predetermined keys (e.g., the Shift and Option keys), a pull-down menu, a pop-up menu or any means known in the art. GUI element 100 may be dismissed in similar fashion. Also in accordance with the invention, GUI element may be opaque for easy viewing or translucent so that the object/image "beneath" it may be viewed.

It is further noted that while the discussion above regarding FIGS. 1A-1D focus on image rotation operations, GUI elements in accordance with the invention are equally applicable to all continuously changeable parameters. For example, a GUI element in accordance with the invention may be used to provide display zoom control, image exposure control, color adjustment, contrast adjustment, brightness, playback volume control or record volume control. The operational features of a GUI element in accordance with the invention for each of these parameters is the same: when the cursor is coincident with the displayed GUI element, the parameter is adjusted at a first (coarse) granularity; as the cursor is moved away from the GUI element, the granularity of cursor movement is increased such that a given motion (e.g., 25° of rotation about the GUI element) results in an ever decreasing magnitude of change in the parameter; and the current value of the parameter is displayed.

A GUI element in accordance with another embodiment of the invention may be used to control or set non-continuously changeable parameters. Illustrative GUI elements of this type provide the ability to scan through a document (e.g., by page, chapter and section) or scroll through a list (e.g., by alpha or date order).

Figure 2A:
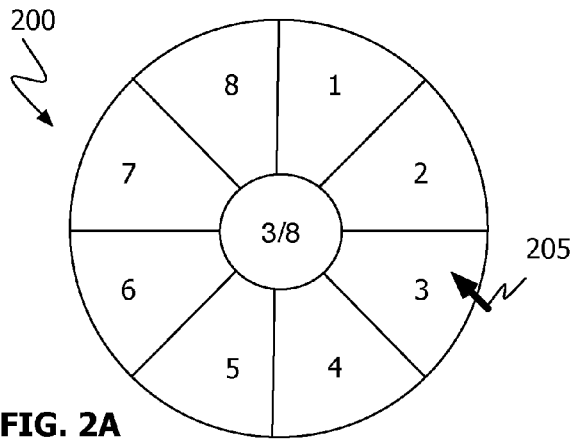
FIG. 2A-2C illustrates, in block diagram form, the operation of a graphical user interface element in accordance with another embodiment of the invention.

Referring to FIG. 2A, in one embodiment a user may scroll through a document using GUI element 200. When cursor 205 is placed over a specific page number (e.g., page 3), that page is displayed. In a manner similar to that discussed above with respect to FIGS. 1A-1D, as cursor 205 is moved away from GUI element 200, the selected page is scrolled up and down (or side to side) if it is not wholly visible in the application's window. Further, as cursor 205 is moved further away from GUI element 200, the slower the displayed page is scrolled.

Figure 2B:
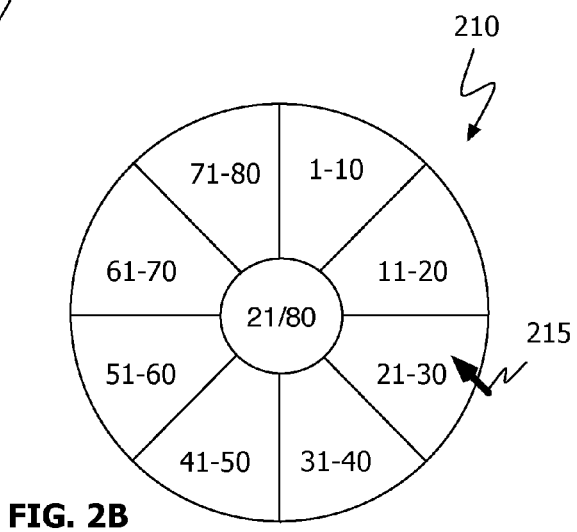
Figure 2C:
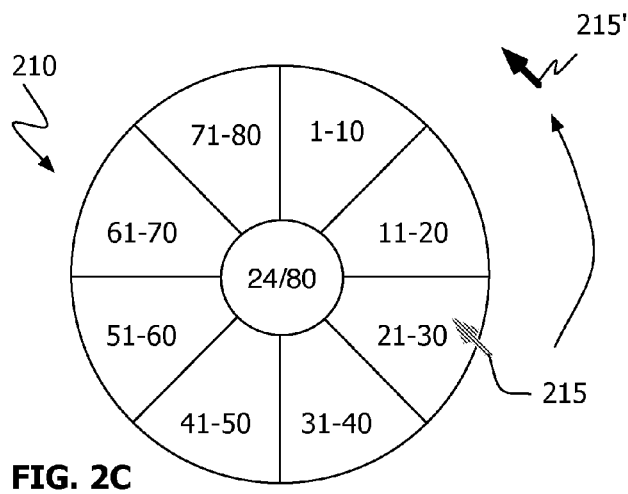

Referring to FIG. 2B, in the case where a document has more pages that GUI element 210 can individually display, each section of GUI element 210 may be associated with a specified page range (e.g., pages 21 through 30). In embodiments of this type, when cursor 215 is over a specified section, the first page of that section is displayed (e.g., page 21). Referring to FIG. 2C, as cursor 215 is moved away from GUI element 210 (e.g., to cursor 215'), individual pages within the specified range are displayed. In a manner similar to that discussed above with respect to FIGS. 1A-1D, as cursor 215 is moved away from and rotated about GUI element 200, movement from page to page (or within a single page) becomes slower and slower.

In one embodiment, when the cursor does not overlap GUI element 200 (205), scroll operations are limited to the displayed page (or page range). In another embodiment, as the cursor is rotated about GUI element 200 scroll operations continue such that page to page (page-range to page-range) scrolling occurs. Other features such as how to display and dismiss GUI elements 200 and 210 and their visible characteristics (e.g., its translucency) may be controlled as discussed above with respect to FIGS. 1A-1D.

In other embodiments, a GUI element in accordance with the invention may be partitioned not by page number as shown in FIGS. 2A-2C, but by some other sorting category such as, for example, by alpha order, date order, file size, etc.

Figure 3:
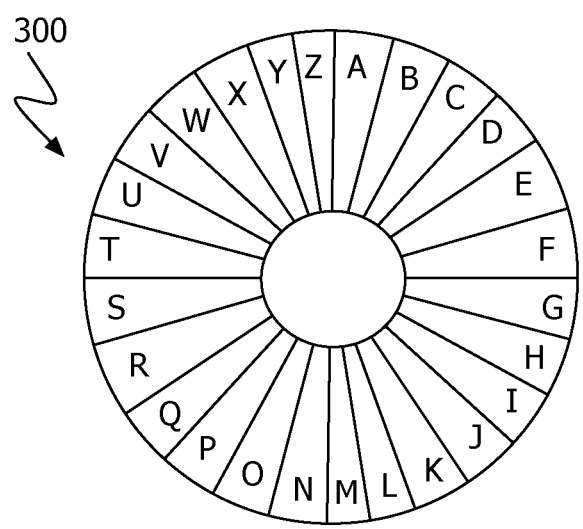
FIG. 3 shows an illustrative GUI element in accordance with yet another embodiment of the invention.

Referring to FIG. 3, illustrative GUI element 300 is partitioned into 26 sections—each section associated with a specific alpha character. GUI element 300 is particularly useful when scrolling through a alpha-sorted list. In embodiments of this nature, when a cursor is placed over GUI element 300 (e.g., over the character F), the particular portion of the list whose sort parameter begins with the character corresponding to, or "beneath," the cursor is displayed. As the cursor is moved away from GUI element 300 and rotated about its center, the underlying list is scrolled. The further the cursor is from GUI element 300, the slower the scroll operation occurs. In this manner, the user may quickly jump through the underlying list (by moving the cursor over various characters displayed by GUI element 300), and slowly scroll through that portion of the list they are most interested in. In another embodiment, groups of letters may be combined into a single section of the GUI element. For example, if the GUI element is too small to be partitioned into 26 sections, but can be partitioned into 13 sections, each section could be assigned a two character range such as A-B, C-D, etc. In some embodiments, when the cursor does not overlap GUI element 300, scroll operations are limited to the displayed range (i.e., to only those list elements whose sort parameter begins with F). In other embodiments, as the cursor is moved away from and rotated about GUI element 300, scroll operations continue such that the list is continuously scrolled (i.e., from list elements whose sort parameter begins with F to list elements whose sort parameter begins with G, . . . ). Other features such as how to display and dismiss GUI element 300) and its visible characteristics (e.g., its translucency) may be controlled as discussed above with respect to FIGS. 1A-1D.

One of ordinary skill in the art will recognize that the principles set forth here are equally applicable to a GUI element that scrolls through a list sorted in accordance with, for example, date or size. In these embodiments, a GUI element in accordance with the invention may use sections having the appropriate category or label (e.g., last week, this week, next week, this year, last year, less than 1 Megabyte, between 1 and 2 megabytes, etc.)

Figure 4:
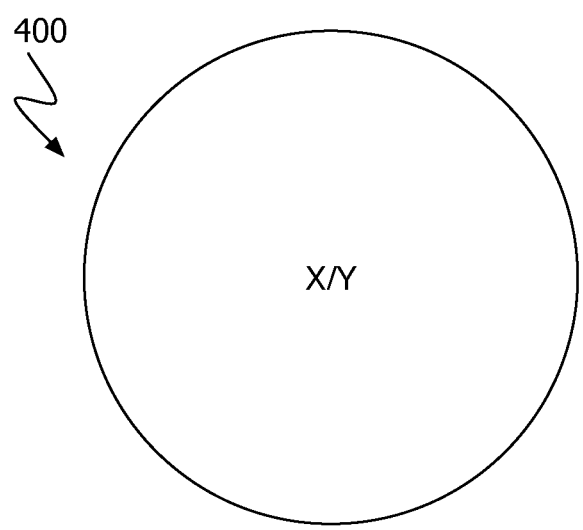
FIG. 4 shows an illustrative GUI element in accordance with still another embodiment of the invention.

In still another embodiment, a GUI element in accordance with the invention may be used to scroll through a list of items that are not easily ordered or for which there are to many categories to identify on the GUI element itself. One example of this may be for date ordered lists or for images sorted in accordance with their size. Lists of this nature can be extremely large and, as a result, include to many elements to be easily displayed in categories that can be displayed on the GUI element. Referring to FIG. 4, in these cases GUI element 400 may be used. As with a GUI element for controlling a continuously changeable parameter (see discussion above), categories or parameter ranges are not displayed. Only the current item (e.g., item X) and, optionally, the total number of items (e.g., Y) are displayed. As in other described embodiments, when a cursor overlaps GUI element 400 the list may be scrolled through at one granularity (e.g., for each 10° of rotation about GUI element 400's center, a screen-full of items are displayed). As the cursor is moved away from, and rotated about the center of GUI element 400, the granularity increases. For example, when the cursor is 1 inch away from GUI element 400 each 10° of rotation about GUI element 400's center could cause 10 elements to be scrolled. And when the cursor is 3 inch away from GUI element 400 each 10° of rotation about GUI element 400's center could cause 2 elements to be scrolled. Other features such as how to display and dismiss GUI element 400) and its visible characteristics (e.g., its translucency) may be controlled as discussed above with respect to FIGS. 1A-1D.

Figure 5:
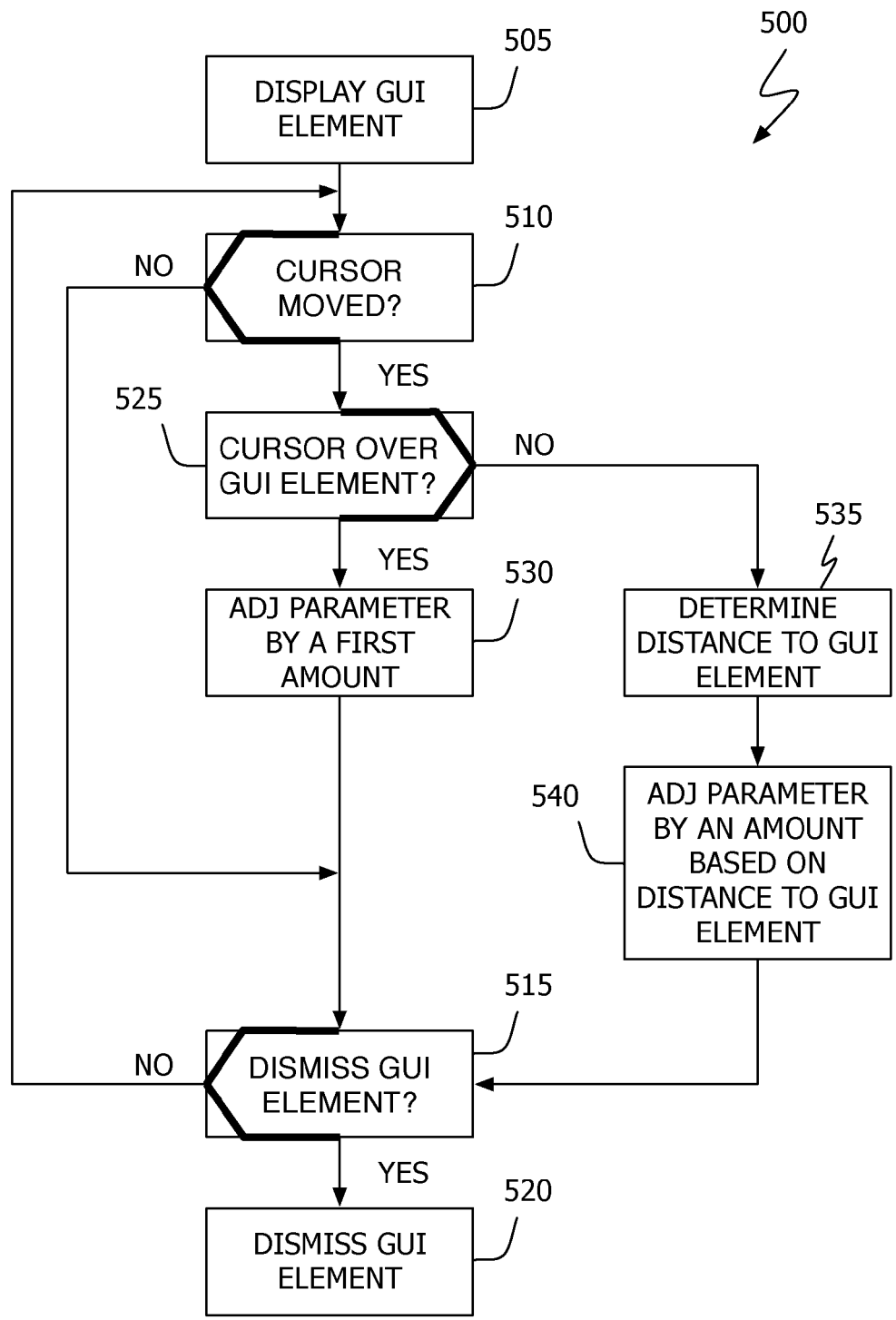
FIG. 5 shows, in flowchart form, a method of operation for a GUI element in accordance with the invention.

Referring to FIG. 5, method of operation 500 for a GUI element in accordance with the invention may be summarized as follows. When a command is received to display the GUI element, it is displayed (block 505). As noted above, a GUI element in accordance with the invention may be displayed through activation of a single predetermined key (e.g., the Option key), a combination of predetermined keys (e.g., the Shift and Option keys), a pull-down menu, a pop-up menu or any means known in the art. In addition, a GUI element in accordance with the invention may be a "static" control associated with and automatically displayed by an application as it is being invoked (e.g., loaded into operational memory and executed). In one embodiment, a GUI element in accordance with the invention is translucent. In another embodiment, a GUI element in accordance with the invention is opaque.

Once displayed, a check is made to determine if the cursor has moved by at least a predetermined amount such as, for example, one pixel (block 510). If the cursor has not moved (the "No" prong of block 510), a check is made to determine if a command to dismiss the GUI element has been received (block 515). If a "dismiss" command has not been received (the "No" prong of block 515), method 500 continues to look for cursor movement (block 510). If a dismiss command has been received (the "Yes" prong of block 515), the GUI element is dismissed or removed from the user's display (block 520).

If cursor movement has been detected (the "Yes" prong of block 510), a check is made to determine if the cursor is over the display region occupied by the GUI element (block 525). If the cursor is positioned over the GUI element (the "Yes" prong of block 525), the parameter being controlled (e.g., the amount of rotation, zoom, volume change, display brightness or the movement within a document or list) is adjusted based on the cursor's position with respect to the GUI element (block 530). For example, if the GUI element displays two or more categories of display (e.g., page ranges 1-20, 21-40, . . . ) the first element in the category over which the cursor is positioned is displayed. If the GUI element does not display a range (as with, for example, a continuously variable parameter such as the amount of zoom to apply), the parameter is adjusted by a first amount that is dependent upon the amount of cursor motion that has occurred about the GUI element's center. Method of operation 500 then continues at block 515 as discussed above.

If the detected cursor movement does not coincide or overlap the displayed GUI element (the "No" prong of block 525), the distance to the cursor from the center of the GUI element is determined (block 535) and, based on this and the amount the cursor has moved about the GUI element's center, the target parameter is adjusted (block 540). For example, a clock-wise rotation of the cursor about the GUI element's center may increase the target parameters value while a counter-clockwise rotation may decrease it. As described above, as the cursor is moved away from the GUI element, the amount of change applied to the parameter being controlled (e.g., the value or amount of zoom or the amount the contents in the underlying window is to be scrolled) is decreased. The relationship between the amount of this distance and the granularity of the change applied to the parameter being controlled is entirely up to the programmer—substantially any functional relationship may be used. For example, in one embodiment a linear function could be used. In another embodiment an exponential function could be used. In yet another embodiment, a combination of linear and exponential functions could be used such that a linear function could be used until the cursor is a specified distance from the GUI element and, at that point, an exponential function could be applied. Method of operation 500 then continues at block 515 as discussed above.

In still another embodiment, a GUI element in accordance with the invention may be embodied as a "static" control associated with one or more parameters (e.g., window scroll operations, image rotation and display zoom) for an executing application. Thus, a GUI element in accordance with the invention may be displayed during program activation and remain on the screen for so long as the program is active. As in prior described embodiments, when a user manipulates a cursor over the displayed GUI element, the parameter is changed in accordance with a first granularity and when the user manipulates the cursor away from the displayed GUI element (e.g., rotates the cursor about the GUI element's center point), the parameter is changed in accordance with a second granularity. As described above, the second granularity may be a function of both the amount of cursor motion (e.g., rotation about the GUI element's center point) and the distance the cursor is from the displayed GUI element.

In a variation of this last embodiment, the GUI element may be selectively displayed or hidden from view by a user in accordance with a specified command (e.g., a menu selection or command-key operation). In still another variation, the GUI element may automatically be displayed and hidden depending on the user's selected operation. For example, if the user selects an object in a display window and then selects a "rotate" action from the application's command interface (e.g., a menu), the program itself may generate a signal to display a GUI element in accordance with the invention.

It will be apparent to those of ordinary skill in the art that GUI elements in accordance with the invention and their methods of use (e.g., as illustrated in FIGS. 1-5) will typically be implemented in large part, if not entirely, through software. Such software would typically be organized into one or more program modules for execution by a programmable control device. As used herein, a programmable control device may be a single computer processor, a special purpose processor (e.g., a digital signal processor, "DSP"), a plurality of processors coupled by a communications link or a custom designed state machine. Custom designed state machines, in turn, may be embodied in a hardware device such as an integrated circuit including, but not limited to, application specific integrated circuits ("ASICs") or field programmable gate array ("FPGAs"). It will further be understood that such software can be stored in a storage device. Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Figure 6:
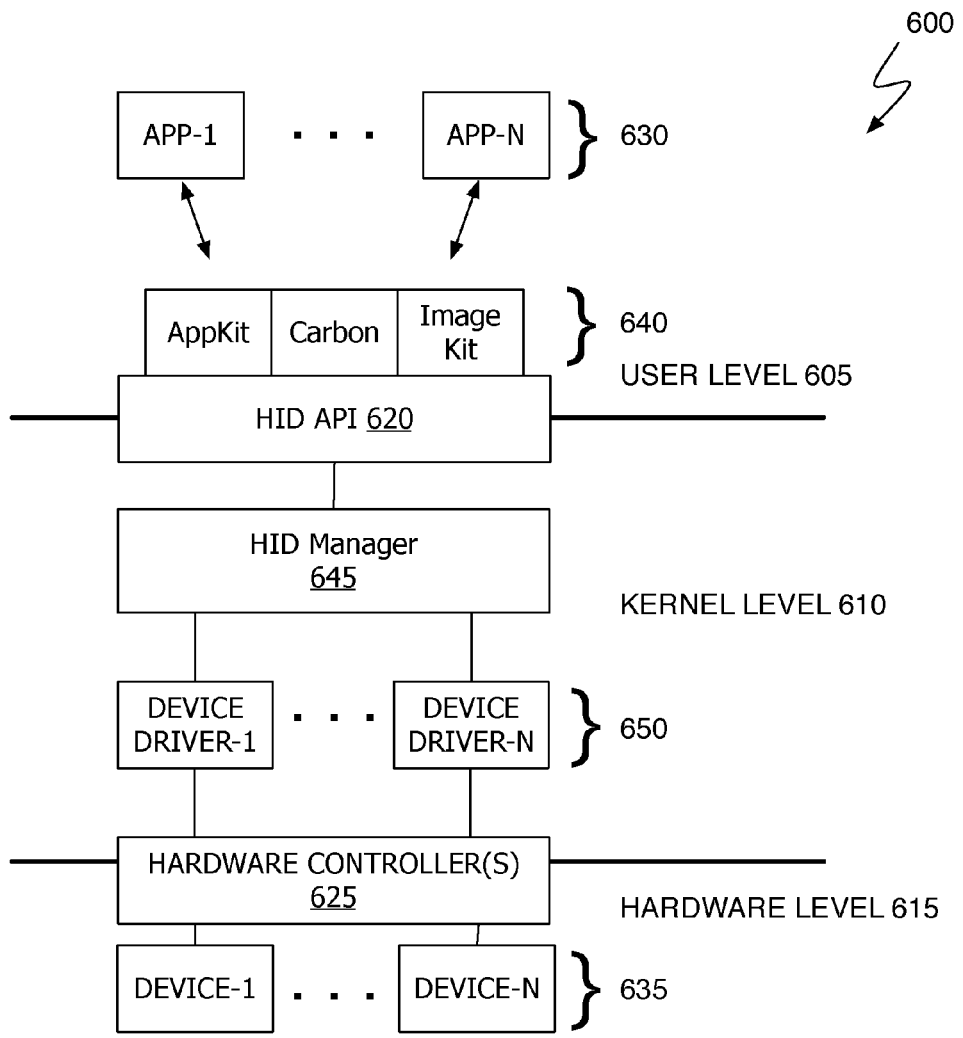
FIG. 6 shows, in block diagram form, a system architecture for a computer system that performs the method of FIG. 5 in accordance with one embodiment of the invention.

One system within which such GUI element software may execute is the Mac OS environment. (MAC OS is a registered trademark of Apple Computer, Inc. of Cupertino, Calif.) Referring to FIG. 6, illustrative system architecture 600 (as provided by the Mac OS X operating system) may be divided into user level 605, kernel level 610 and hardware level 615. Mediating the interface between user level 605 and kernel level 610 is Human Interface Device (HID) application program interface (API) module 620. Mediating the interface between kernel level 610 and hardware level 615 is one or more hardware controllers 625. User-level programs 630 (e.g., application-1 and application-N) execute within user level 605 and communicate with hardware devices 635 (e.g., device-1 and device-2) through one or more user interface frameworks 640, HID API 620, HID manager module 645, one or more device drivers 650 and one or more hardware controllers 625. Illustrative hardware devices include cursor control devices such as a mouse, a track pad and a track ball.

In the Mac OS X environment, user interface frameworks 640 are collections of APIs that provide specific capabilities. For example, the Application Kit (AppKit) is a collection of APIs containing all the objects needed to implement a graphical, event-driven user interface: windows, panels, buttons, menus, scrollers, and text fields. Similarly, Carbon is a collection of C programming interfaces that let a programmer implement basic application functionality such as the user interface, event handling, file management, and so on. In like manner, Image Kit is a collection of APIs that provide access to built-in image filters for both video and still images and support for creating custom filters.

In one embodiment, program code to implement a GUI element in accordance with the invention may be provided through the Image Kit framework. This is a logical location when the objects to be manipulated are graphical objects (see discussion above regarding FIGS. 1A-1D). In another embodiment, program code to implement a GUI element in accordance with the invention may be incorporated within the Application Kit and/or Carbon frameworks. In yet another embodiment, program code to implement a GUI element in accordance with the invention may be incorporated in a user-level application or HID manager 645.

Finally, it will be recognized that while operation of a GUI element in accordance with the invention has been described in terms of a mechanism that increases granularity as a user moves a cursor further away from the GUI element, the invention may also be applied in reverse. That is, when the cursor overlaps the GUI element, a fine control may be applied and as the cursor is moved further from the GUI element, control of the target parameter could become progressively more coarse.

The invention claimed is:

1. A graphical interface method, comprising:
displaying a graphical interface element that is associated with a parameter having a value;
selecting a granularity of change for the parameter based at least in part on a distance of user interaction from the displayed graphical interface element;
changing continuously the extent of change reflected by the granularity as the distance of the user interaction from the displayed graphical interface element changes; and
adjusting the value of the parameter in accordance with the granularity in response to a user interacting with a graphical interface and to an extent based on the extent of change reflected by the granularity and based on an extent to which user interaction relative to the graphical interface rotates about the displayed graphical interface element.

2. The graphical interface method of claim 1, wherein the parameter comprises a display parameter.

3. The graphical interface method of claim 2, wherein the display parameter comprises one of the following display parameters: display zoom, image exposure, image rotation, color adjustment, contrast, brightness, page number display and a scroll value.

4. The graphical interface method of claim 1, wherein the parameter comprises a non-display parameter.

5. The graphical interface method of claim 4, wherein the non-display parameter comprises a volume parameter.

6. The graphical interface method of claim 1, wherein the displayed graphical interface element is opaque.

7. The graphical interface method of claim 1, wherein the displayed graphical interface element is translucent.

8. The graphical interface method of claim 1, wherein the displayed graphical interface element is associated with an application and is displayed automatically by the application when the application is executed.

9. The graphical interface method of claim 1, wherein the act of displaying comprises displaying the graphical interface element in response to a first signal.

10. The graphical interface method of claim 9, wherein the first signal comprises a combination of one or more specified keyboard key strokes.

11. The graphical interface method of claim 9, further comprising dismissing the displayed graphical interface element in response to a second signal.

12. The graphical interface method of claim 11, wherein the second signal comprises a specified combination of one or more keyboard key strokes.

13. A non-transitory program storage device, readable by a programmable control device, comprising instructions stored on the program storage device for causing the programmable control device to perform a method in accordance with claim 1.

14. The method of Claim 1, wherein changing continuously the extent of change reflected by the granularity as the distance of the user interaction from the displayed graphical interface element changes involves reducing continuously the extent of change reflected by the granularity as the distance of the user interaction from the displayed graphical interface element increases.

15. A method to adjust the display of an application, comprising:
receiving a first signal;
displaying a user interface element in response to the first signal;
selecting a first granularity for a display characteristic of an application when a cursor is determined to overlap the displayed user interface element, the first granularity specifying a first granularity of change for the display characteristic;
selecting a second granularity for the display characteristic of the application when the cursor is determined to not overlap the displayed user interface element, the second granularity being different from the first granularity and specifying a second granularity of change for the display characteristic;
adjusting the display characteristic of the application at the first granularity in response to a user manipulating the cursor in a display region that is determined to overlap the displayed user interface element; and
adjusting the display characteristic of the application at the second granularity in response to the user manipulating the cursor in a display region that is determined to not overlap the displayed user interface element;
wherein the act of adjusting the display characteristic of the application at the second granularity comprises adjusting the display characteristic based at least in part on the second granularity and how much the cursor is rotated about the displayed user interface element;
wherein the second granularity becomes continuously finer with respect to the first granularity the further away from the displayed user interface element the cursor is moved.

16. The method of claim 15, wherein the first signal comprises a combination of one or more specified keyboard key strokes.

17. The method of claim 15, wherein the first signal comprises a combination of a mouse activation and a specified combination of one or more specified keyboard key strokes.

18. The method of claim 15, wherein the user interface element is translucent.

19. The method of claim 15, wherein the first granularity is coarse and the second granularity is fine relative to the first granularity.

20. The method of claim 19, wherein the display characteristic comprises a page, the first granularity comprises movement between pages and the second granularity comprises movement within a displayed page.

21. The method of claim 19, wherein the display characteristic comprises an angle of rotation, the first granularity comprises rotation in a specified step, in degrees, and the second granularity comprises rotation in increments less than the specified step.

22. The method of claim 19, wherein the display characteristic comprises scrolling through an ordered list, the first granularity comprises scrolling across predefined categories and the second granularity comprises scrolling within a pre-defined category.

23. The method of claim 22, wherein the pre-defined category comprises an alphabetical sort such that the first granularity comprises scrolling between successive alphabetical groupings in the ordered list and the second granularity comprises scrolling within an alphabetical grouping.

24. The method of claim 22, wherein the pre-defined category comprises a chronological sort such that the first granularity comprises scrolling across successive date ranges in the chronologically ordered list and the second granularity comprises scrolling within a single date range.

25. The method of claim 24, wherein the date range comprises one of the following: second, minute, hour, day, week, month, quarter and year.

26. The method of claim 15, wherein the act of displaying a user interface element comprises displaying a user interface element that identifies a first granularity.

27. The method of claim 26, wherein the first granularity comprises a plurality of distinct display regions, each display region identified by a page number, a range of page numbers, an alphabetical character, a range of alphabetical characters, an angle of rotation quanta, or a specified quanta of exposure.

28. The method of claim 26, wherein the act of displaying a user interface element further comprises displaying a user selected display adjustment, wherein the user selected display adjustment comprises the combination of the first and second granularity.

29. The method of claim 15, wherein the displayed user interface element comprises a circular region.

30. The method of claim 15, further comprising:
receiving a second signal; and
removing the displayed user interface element in response to the second signal.

31. The method of claim 30, wherein the second signal comprises a combination of one or more specified keyboard key strokes.

32. The method of claim 30, wherein the second signal comprises a specified one or more keyboard key strokes and a mouse button activation.

33. A non-transitory program storage device, readable by a programmable control device, comprising instructions stored on the program storage device for causing the programmable control device to perform a method in accordance with claim 15.

34. A system comprising:
a processing device configured to be communicatively coupled to a cursor control device and a display device wherein the processing device is programmed to perform the following acts:
display a graphical user interface element that is associated with a parameter having a value;
select a first granularity for the parameter when a cursor is determined to be coincident with the displayed graphical user interface element, the first granularity specifying a first granularity of change for the parameter;
select a second granularity for the parameter when the cursor is determined not to be coincident with the displayed graphical user interface element, the second granularity being different from the first granularity and specifying a second granularity of change for the parameter;
adjust the value of the parameter in accordance with the first granularity in response to a user manipulating the cursor in a display region determined to be coincident with the displayed graphical user interface element; and adjust the value of the parameter in accordance with the second granularity in response to a user manipulating the cursor in a display region determined to be not coincident with the displayed graphical user interface element;

wherein the act of adjusting the value of the parameter comprises adjusting the value of the parameter based at least in part on the second granularity and how much the cursor is rotated about the displayed graphical user interface element;

wherein the second granularity becomes continuously finer with respect to the first granularity the further away from the displayed user interface element the cursor is moved.

35. A graphical user interface method, comprising:

displaying a graphical user interface element that is associated with a parameter having a value;

selecting a first granularity for the parameter when an indication of user action is determined to be coincident with the displayed graphical user interface element, the first granularity specifying a first granularity of change for the parameter;

selecting a second granularity for the parameter when the indication of user action is determined not to be coincident with the displayed graphical user interface element, the second granularity being different from the first granularity and specifying a second granularity of change for the parameter;

adjusting the value of the parameter in accordance with the first granularity in response to the indication of user action in a display region determined to be coincident with the displayed graphical user interface element; and adjusting the value of the parameter in accordance with the second granularity in response to the indication of user action in a display region determined to be not coincident with the displayed graphical user interface element;

wherein the act of adjusting the value of the parameter comprises adjusting the value of the parameter based at least in part on the second granularity and how much the cursor is rotated about the displayed graphical user interface element;

wherein the second granularity becomes continuously finer with respect to the first granularity the further away from the displayed user interface element the indication of user action occurs.

36. The graphical interface method of claim 35, wherein the displayed graphical interface element is opaque.

37. The graphical interface method of claim 35, wherein the displayed graphical interface element is translucent.

38. A non-transitory program storage device, readable by a programmable control device, comprising instructions stored on the program storage device for causing the programmable control device to perform a method in accordance with claim 35.

39. A system comprising:

a processing device configured to be communicatively coupled to a display device wherein the processing device is programmed to perform the following acts:

display a graphical user interface element that is associated with a parameter having a value;

select a first granularity for the parameter when a user input action is determined to be coincident with the displayed graphical user interface element, the first granularity specifying a first granularity of change for the parameter;

select a second granularity for the parameter when the user input action is determined not to be coincident with the displayed graphical user interface element, the second granularity being different from the first granularity and specifying a second granularity of change for the parameter;

adjust the value of the parameter in accordance with the first granularity in response to the user input action in a display region determined to be coincident with the displayed graphical user interface element; and adjust the value of the parameter in accordance with the second granularity in response to the user input action in a display region determined to be not coincident with the displayed graphical user interface element;

wherein the act of adjusting the value of the parameter comprises adjusting the value of the parameter in response to the second granularity and how much the user input action rotates about the displayed graphical user interface element;

wherein the second granularity becomes continuously finer with respect to the first granularity the further away from the displayed user interface element the user input action occurs.

* * * * *